(12) United States Patent
Ichinohe et al.

(10) Patent No.: US 7,596,853 B2
(45) Date of Patent: Oct. 6, 2009

(54) METHOD OF MANUFACTURING THIN FILM MAGNETIC HEAD HAVING LOWER SHIELD LAYER EMBEDDED IN INSULATING

(75) Inventors: Kenji Ichinohe, Niigata-ken (JP); Yosuke Goto, Niigata-ken (JP)

(73) Assignee: TDK Corporation, Tokyo (JP)

( * ) Notice: Subject to any disclaimer, the term of this patent is extended or adjusted under 35 U.S.C. 154(b) by 142 days.

(21) Appl. No.: 11/617,657

(22) Filed: Dec. 28, 2006

(65) Prior Publication Data

US 2007/0157459 A1    Jul. 12, 2007

(30) Foreign Application Priority Data

Jan. 10, 2006   (JP)   .............................. 2006-002361

(51) Int. Cl.
*G11B 5/127*  (2006.01)
*H04R 31/00*  (2006.01)

(52) U.S. Cl. .............. 29/603.13; 29/603.08; 29/603.12; 29/603.14; 29/603.16; 29/603.18; 205/119; 205/122; 216/62; 216/65; 216/66; 380/121; 380/122; 380/317; 427/127; 427/128

(58) Field of Classification Search .............. 29/603.12, 29/603.13–603.16, 603.18; 216/62, 65, 66; 205/119, 122; 360/121, 122, 317; 451/5, 451/41

See application file for complete search history.

(56) References Cited

U.S. PATENT DOCUMENTS 5,898,542 A * 4/1999 Koshikawa et al. ...... 360/234.7
6,628,484 B2 * 9/2003 Werner ....................... 360/319

FOREIGN PATENT DOCUMENTS

JP         2004-272998         9/2004

* cited by examiner

*Primary Examiner*—Paul D Kim
(74) *Attorney, Agent, or Firm*—Brinks Hofer Gilson & Lione

(57) ABSTRACT

The method of manufacturing a thin film magnetic head includes forming a first recessed portion for insulation and a second recessed portion for contact that reach the substrate through the first insulating layer from a side of the first insulating layer of the substrate having the first insulating layer thereon; forming a second insulating layer on the substrate in the first recessed portion; and forming the lower shield layer in the first recessed portion and a contact portion in the second recessed portion.

11 Claims, 5 Drawing Sheets

METHOD OF MANUFACTURING THIN FILM MAGNETIC HEAD HAVING LOWER SHIELD LAYER EMBEDDED IN INSULATING

This patent document claims the benefit of Japanese Patent Application No. 2006-002361 filed on Jan. 10, 2006, which is hereby incorporated by reference.

BACKGROUND

1. Field

The present embodiments relate to a method of manufacturing a thin film magnetic head.

2. Related Art

In general, a thin film magnetic head mounted in a hard disk drive or the like is a composite thin film magnetic head having a MR (magneto-resistive) head for reproduction, which shows a high magneto-resistive effect, and an inductive head for recording, which has a core and a coil (for example, refer to JP-A-2004-272998)

The MR head of the thin film magnetic head has a configuration in which a magneto-resistive effect element is provided between an upper shield layer and a lower shield layer and the lower shield layer is embedded in an insulating layer. In the MR head, heat is generated due to a detection current flowing through the magneto-resistive effect element, and thus the magneto-resistive effect element protrudes (PTP: pole tip protrusion) from an ABS (air bearing surface). This causes the MR head and a media to come into contact with each other, which is one cause of destruction of the MR head. Accordingly, a thin film magnetic head having a good heat dissipation property that lowers the inside temperature of the thin film magnetic head is desired. For example, a thin film magnetic head, which has a good heat dissipation property while maintaining insulation between a lower shield layer and a substrate, is desired.

SUMMARY

The present embodiments may obviate one or more of the limitations and drawbacks of the related art. For example, in one embodiment, a method of manufacturing a thin film magnetic head is capable of obtaining a good heat dissipation property while maintaining insulation between a lower shield layer and a substrate.

In one embodiment, a method of manufacturing a thin film magnetic head that has a thin film magnetic head element provided on a substrate with a first insulating layer therebetween and has a structure, on the substrate, in which a lower shield layer is embedded in the first insulating layer, the thin film magnetic head element having a magneto-resistive effect element between an upper shield layer and the lower shield layer, includes: forming a recessed portion reaching the substrate through the first insulating layer from a side of the first insulating layer of the substrate having the first insulating layer thereon; forming a second insulating layer on the substrate in the recessed portion; and forming the lower shield layer in the recessed portion.

In one embodiment, the recessed portion for a lower shield layer is formed and then the second insulating layer is formed. In this embodiment, since the insulating layer is formed by film formation, the layer thickness may be controlled. In the recessed portion for a lower shield layer, it becomes possible to precisely control the thickness of the second insulating layer serving to separate the lower shield layer and the substrate from each other. Accordingly, it is possible to reliably improve the insulation between the lower shield layer and the substrate. Since the recessed portion for a lower shield layer is formed to be embedded into the substrate, a heat dissipation path between the lower shield layer and the substrate can be shorten. For example, thermal resistance may be reduced, which improves the heat dissipation property.

In one embodiment, a method of manufacturing a thin film magnetic head that has a thin film magnetic head element provided on a substrate with a first insulating layer therebetween and has a structure, on the substrate, in which a lower shield layer is embedded in the first insulating layer, the thin film magnetic head element having a magneto-resistive effect element between an upper shield layer and the lower shield layer, includes: forming a first recessed portion for insulation and a second recessed portion for contact that reach the substrate through the first insulating layer from a side of the first insulating layer of the substrate having the first insulating layer thereon; forming a second insulating layer on the substrate in the first recessed portion; and forming the lower shield layer in the first recessed portion and a contact portion in the second recessed portion.

In one embodiment, it is possible to form a lower shield layer having good heat dissipation and insulation properties, and to form a contact portion by using a process of forming the lower shield layer.

In one embodiment, the depth of the substrate in the second recessed portion is about 0.05 μm to 0.5 μm. In one embodiment, the depth of the substrate in the first recessed portion is about 0.05 μm to 0.5 μm.

DETAILED DESCRIPTION

Figure 1:
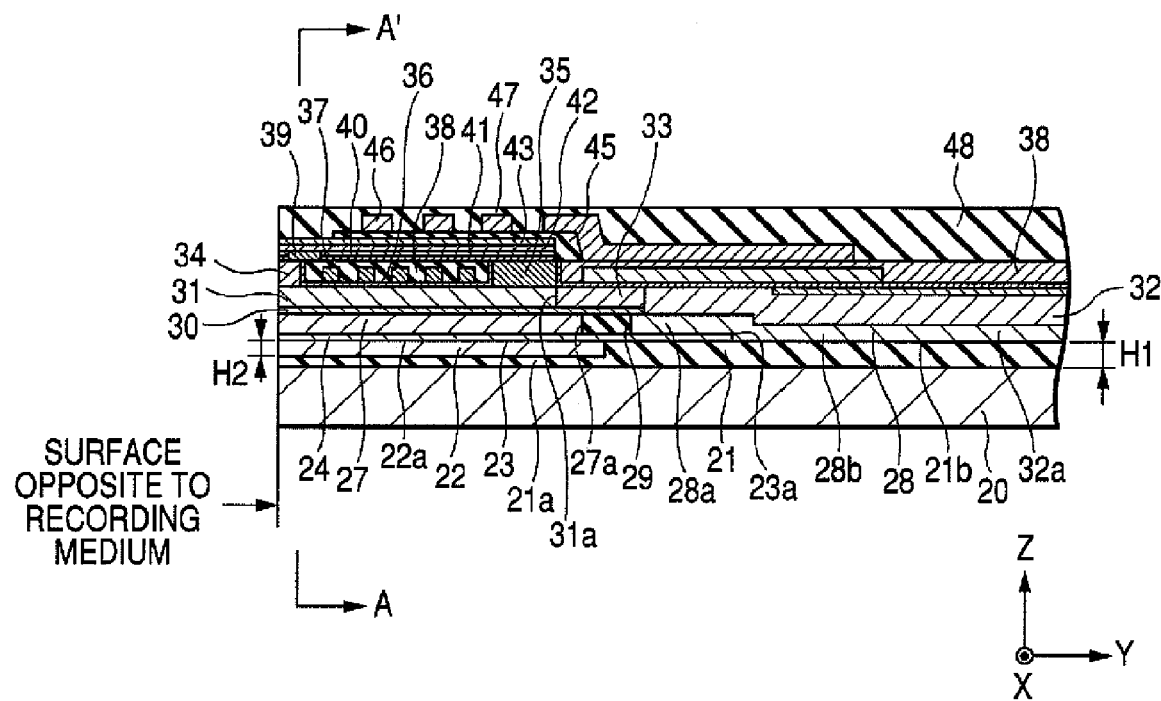
FIG. 1 is a longitudinal sectional view illustrating one embodiment of a thin film magnetic head.

FIG. 1 is a longitudinal sectional view illustrating one embodiment of a thin film magnetic head. In the description below, an X direction in FIG. 1 is called a track width direction and a Y direction in FIG. 1 is called a height direction. A Z direction in FIG. 1 is a movement direction of a recording medium (recording disc). A front end surface (leftmost surface shown in FIG. 1) of the thin film magnetic head is called a 'surface opposite to a recording medium'. In addition, a 'front end surface (front end portion)' of each layer refers to a left surface in FIG. 1, and a 'rear end surface (rear end portion)' of each layer refers to a right surface in FIG. 1.

The thin film magnetic head according to one embodiment is a thin film magnetic head having a recording head unit (inductive head) and a reproduction head unit (MR head). For example, in the thin film magnetic head according to one embodiment, a recording head unit is provided on an insulating layer and a reproduction head unit is provided below the insulating layer.

In one embodiment, a substrate 20 is a slider and is made of, for example, alumina titan carbide ($Al_2O_3$—TiC). On the substrate 20, an insulating layer 21 serving as a base layer is formed. A material of the insulating layer 21 includes an Al—O-based material, for example, $Al_2O_3$, an Al—Si—O-based material, for example, AlSiO, an Si—O-based material, for example, $SiO_2$, and the like. The insulating layer 21 is formed with a first recessed portion 21a in the height direction from the surface opposite to a recording medium. A film thickness H1 of the insulating layer 21 other than a region where the first recessed portion 21a is formed and is, for example, about 1.0 μm to 3.0 μm, and a maximum depth H2 of the first recessed portion 21a is about 0.5 μm to 1.5 μm. The insulating layer 21 may have a single-layered structure or a multi-layered structure.

Inside the first recessed portion 21a, a lower shield layer 22 made of for example, NiFe-based alloy or sendust is formed. The lower shield layer 22 is embedded in the insulating layer 21. An upper surface 22a of the lower shield layer 22 and an upper surface 21b of the insulating layer 21 are planarized.

In one embodiment, a gap layer 23 made of an insulating material, for example, $Al_2O_3$, is formed on the upper surface 22a of the lower shield layer 22 and the upper surface 21b of the insulating layer 21 so as to overlap each other. A magneto-resistive effect element 24, which is represented by a GMR (giant magneto-resistive) element such as a spin valve type thin film element, is formed within the gap layer 23, and a front end surface of the magneto-resistive effect element 24 is exposed on the surface opposite to a recording medium. An upper shield layer 27 made of, for example, NiFe-based alloy is formed on the gap layer 23.

In one embodiment, at a region located behind the rear end surface 27a of the upper shield layer 27 in the height direction, a second metal-layer 28 is formed so as to be separated from the upper shield layer 27. A front region 28a, which is located at the side of the surface opposite to a recording medium, of the second metal layer 28 is formed on the gap layer 23, and a rear region 28b of the second metal layer 28 is formed on the gap layer 23 and the insulating layer 21 so as to be bent downward from the gap layer 23 over the rear region in the height direction.

In one embodiment, an insulating layer 29 made of, for example, $Al_2O_3$, is embedded between the upper shield layer 27 and the second metal layer 28. A part ranging from the lower shield layer 22 to the upper shield layer 27 is called a reproduction head (MR head).

In one embodiment, a separation layer 30 made of, for example, $Al_2O_3$ is formed on the upper shield layer 27. The separation layer 30 may not be an essential component. For example, the upper shield layer 27 may serve as a lower core layer of a recording head unit. A lower core layer 31 is formed on the separation layer 30. The lower core layer 31 is made of a magnetic material, for example, NiFe-based alloy. The lower core layer 31 is formed in the height direction (Y direction shown in FIG. 1) from the surface opposite to a recording medium so as to have a predetermined length.

In one embodiment, at the position apart from a rear end surface 31a of the lower core layer 31 in the height direction, a third metal layer 32 is formed so as to be separated from the lower core layer 31. A lower surface 32a of the third metal layer 32 is formed to be adjacent to an upper surface of the second metal layer 28. An insulating layer 33 made of, for example, $Al_2O_3$, is embedded between the lower core layer 31 and the third metal layer 32.

In one embodiment, on the lower core layer 31, a protruding layer 34 is formed in the height direction (Y direction shown in the drawing) from the surface opposite to a recording medium so as to have a predetermined length. In addition, a back gap layer 35 is formed on the lower core layer 31 so as to be located apart from a height-direction rear end surface of the protruding layer 34 in the height direction (Y direction shown in the drawing) by predetermined distance. The protruding layer 34 and the back gap layer 35 are made of a magnetic material. The magnetic material may be the same as a material of the lower core layer 31 or different from that of the lower core layer 31. The protruding layer 34 may have a single-layered structure or a multi-layered structure. The protruding layer 34 and the back gap layer 35 are magnetically connected to the lower core layer 31.

In one embodiment, a coil-insulation base layer 36 is formed on the lower core layer 31 between the protruding layer 34 and the back gap layer 35, and a plurality of first coil pieces 37 are formed on the coil-insulation base layer 36. The first coil pieces 37 are embedded in a coil insulating layer 38 made of an insulating material, for example, $Al_2O_3$. On the protruding layer 34 and the coil insulating layer 38, a Gd regulation layer 39 is formed toward the height direction from a position, which is predetermined distance apart from the surface opposite to a recording medium in the height direction (Y direction shown in the drawing).

A lower magnetic layer 40 and a gap layer 41 are sequentially formed on the protruding layer 34 ranging from the surface opposite to a recording medium to a front end surface of the Gd regulation layer 39, on the coil insulating layer 38 in the height direction from a rear end surface of the Gd regulation layer 39, and on the back gap layer 35. The dimension of the gap layer 41 in the height direction is regulated by the Gd regulation layer 39. An upper magnetic layer 42 is formed on the gap layer 41 and the Gd regulation layer 39, and an upper core layer 43 is formed on the upper magnetic layer 42.

In one embodiment, on the upper core layer 43, an insulating layer 45 made of an insulating material, for example, a resist or Al$_2$O$_3$. A plurality of second coil pieces 46 are formed on the insulating layer 45. End portions of the first coil pieces 37 and end portions of the second coil pieces 46 are electrically connected to each other in the track width direction thereof, and a troidal coil layer 47 that has the first coil pieces 37 and the second coil pieces 46 and is wound with the magnetic layer as an axis is formed. On the troidal coil layer 47, a protective layer 48 made of an insulating material, for example, Al$_2$O$_3$ or AlSiO.

A method of forming the lower shield layer 22 of the thin film magnetic head having the above configuration will be described. For example, in the method of manufacturing a thin film magnetic head according to a embodiment. In one embodiment, a thin film magnetic head has a thin film magnetic head element provided on a substrate with a first insulating layer therebetween. The thin film magnetic head element includes a magneto-resistive effect element between an upper shield layer and a lower shield layer and the lower shield layer is embedded in the first insulating layer. A recessed portion reaches the substrate from a side of the first insulating layer of the substrate, on which the first insulating layer is formed, through the first insulating layer is formed. A second insulating layer is formed on the substrate in the recessed portion, and the lower shield layer is formed in the recessed portion.

In the present embodiment, it is described about a case of manufacturing a structure including a region, in which the lower shield layer 22 is insulated from the substrate 20, and a region in which the lower shield layer 22 is in contact with the substrate 20. For example, a first recessed portion for insulation and a second recessed portion for contact, which reach the substrate from the first insulating layer side of the substrate having the first insulating layer through the first insulating layer, are formed. The second insulating layer is formed on the substrate in the first recessed portion, and the lower shield layer is formed in the first recessed portion and a contact portion is formed in the second recessed portion. In the method described above, it is possible to form a lower shield layer having good heat dissipation and insulation properties, and to form the contact portion by using a process of forming the lower shield layer.

FIGS. 2A to 2E, 3A to 3E, and 4A to 4D are traverse sectional views that illustrate various embodiments of the method of manufacturing a thin film magnetic head according to the embodiment of the invention. FIGS. 2A to 2E, 3A to 3E, and 4A to 4D are cross-sectional views taken along the lines IIA-IIA, IIB-IIB, IIC-IIC, IID-IID, IIE-IIE, IIIA-IIIA, IIIB-IIIB, IIIC-IIIC, IIID-IIID, IIIE-IIIE, IVA-IVA, IVB-IVB, IVC-IVC, and IVD-IVD of FIG. 1, respectively. Portions, which are not shown in the cross-sectional views, located above the insulating layer 21-1 are omitted.

Figure 2A:
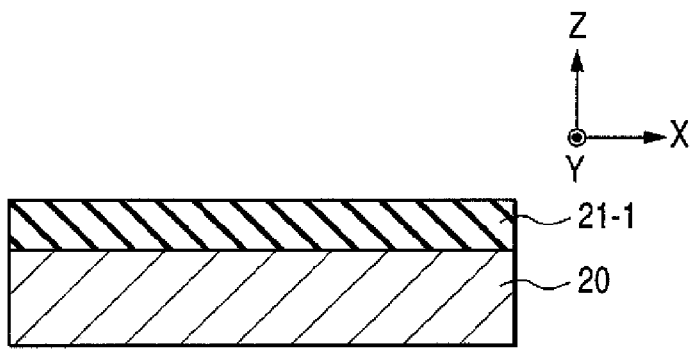
FIG. 2A is a traverse sectional view illustrating one embodiment of a method of manufacturing a thin film magnetic head.
Figure 2B:
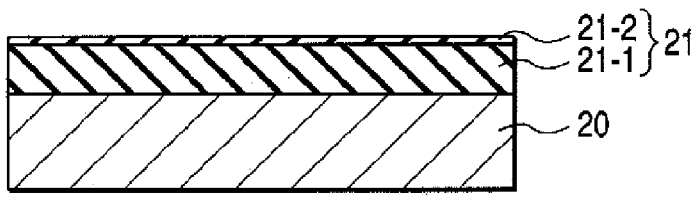
FIG. 2B is a traverse sectional view illustrating one embodiment of a method of manufacturing a thin film magnetic head.

In one embodiment, the substrate 20 having the insulating layer 21-1 shown in FIG. 2A is prepared. The insulating layer 21-1 may be made of, for example, Al$_2$O$_3$. Alternatively, without preparing the substrate 20 having the insulating layer 21-1, the insulating layer 21-1 having a predetermined film thickness may be formed on the substrate 20. In one embodiment, as shown in FIG. 2B, SiO$_2$ is coated onto the insulating layer 21-1 by using, for example, a sputtering method, thereby forming an insulating layer 21-2. The insulating layers 21-1 and 21-2 form the first insulating layer.

Figure 2C:
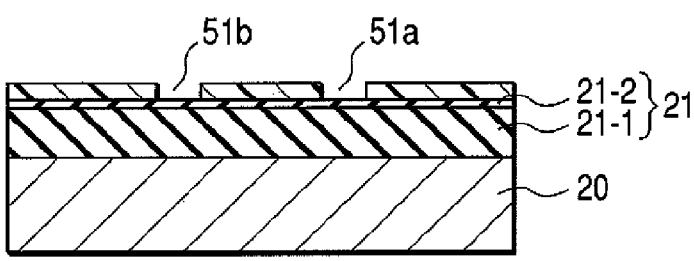
FIG. 2C is a traverse sectional view illustrating one embodiment of the method of manufacturing a thin film magnetic head.
Figure 2D:
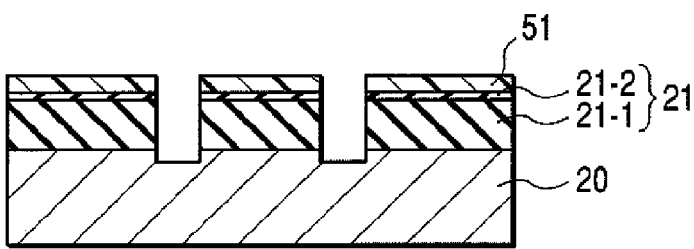
FIG. 2D is a traverse sectional view illustrating one embodiment of the method of manufacturing a thin film magnetic head.
Figure 2E:
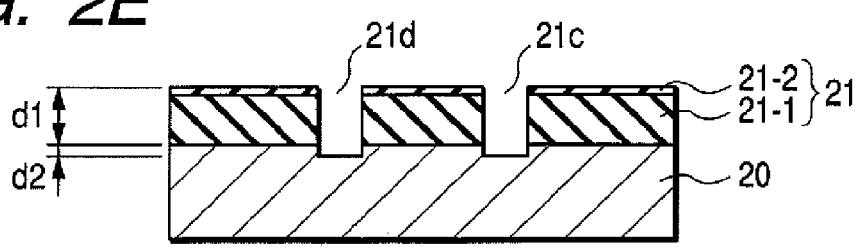
FIG. 2E is a traverse sectional view illustrating one embodiment of the method of manufacturing a thin film magnetic head.

In one embodiment, as shown in FIG. 2C, a resist layer 51 is formed by coating resist on the insulating layer 21-2, and then openings 51a and 51b are formed by exposing and developing regions that are open on the resist layer 51. The opening 51a is an opening for a lower shield layer and the opening 51b is an opening for a contact portion. In one embodiment, as shown in FIG. 2D, the insulating layers 21-1 and 21-2 are dry-etched by using an ion milling method or a reactive ion etching (RIE) method with the resist layer 51 having the openings 51a and 51b as a mask, thereby forming a recessed portion (first recessed portion) 21c for a lower shield layer and a recessed portion 21d for a contact portion. These recessed portions 21c and 21d are formed to be embedded into the substrate 20. In one embodiment, as shown in FIG. 2E, the resist layer 51 is removed.

In one embodiment, a depth d1 of the recessed portion 21c for a lower shield layer may be about 0.5 μm to 5 μm in consideration of element characteristic or the like. In one embodiment, a depth d2 by which the recessed portion 21c for a lower shield layer is embedded into the substrate 20 is about 0.05 μm to 0.5 μm in consideration of insulation from the substrate.

In one embodiment, the recessed portion 21d for a contact portion has the same depth d1 as the recessed portion 21c for a lower shield layer, and the depth d2 by which the recessed portion 21d for a contact portion is embedded into the substrate 20 is also the same as the recessed portion 21c for a lower shield layer.

Figure 3A:
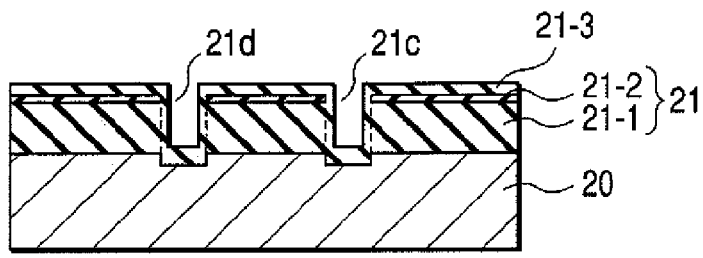
FIG. 3A is a traverse sectional view illustrating one embodiment of the method of manufacturing a thin film magnetic head.

In one embodiment, as shown in FIG. 3A, Al$_2$O$_3$ is coated onto the insulating layer 21 having the recessed portions 21c and 21d by using, for example, a sputtering method, thereby forming an insulating layer 21-3 serving as a second insulating layer. The insulating layer 21-3 is formed to have a thickness by which heat generated by a head provided above the lower shield layer 22 can be sufficiently dissipated to the substrate 20 and the insulation between the lower shield layer 22 and the substrate 20 can be maintained. For example, in one embodiment, the thickness of the insulating layer 21-3 may be 0.1 μm to 0.5 μm. The insulating layers 21-1 and 21-3 may be made of, for example, Al$_2$O$_3$ and the insulating layer 21-2 may be made of, for example, SiO$_2$. A material of the insulating layer 21-1 to 21-3 is not limited as long as the insulation between the lower shield layer 22 and the substrate 20 is secured.

In one embodiment, the recessed portion 21c for a lower shield layer is formed and then the insulating layer 21-3 is formed. Since the insulating layer 21-3 is formed by film formation, the layer thickness may be controlled. Accordingly, in the recessed portion 21c for a lower shield layer, it becomes possible to precisely control the thickness of the insulating layer 21-3 serving to separate the lower shield layer 22 and the substrate 20 from each other. It is possible to reliably improve the insulation between the lower shield layer 22 and the substrate 20. In addition, since the recessed portion 21c for a lower shield layer is formed to be embedded into the substrate 20, a heat dissipation path between the lower shield layer 22 and the substrate 20 may be shorten, which improves the heat dissipation property.

Figure 3B:
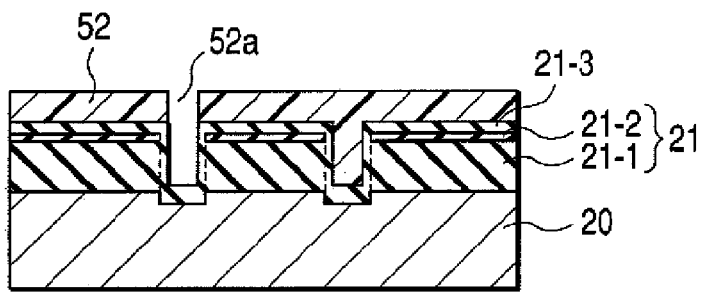
FIG. 3B is a traverse sectional view illustrating one embodiment of the method of manufacturing a thin film magnetic head.
Figure 3C:
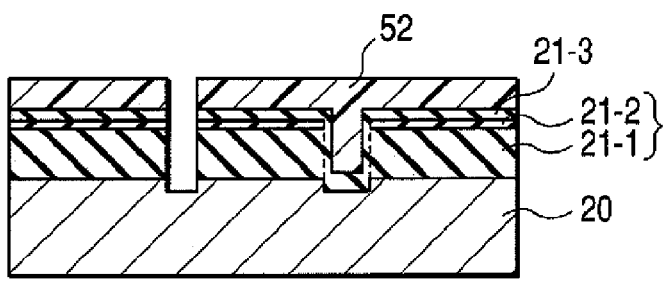
FIG. 3C is a traverse sectional view illustrating one embodiment of the method of manufacturing a thin film magnetic head.
Figure 3D:
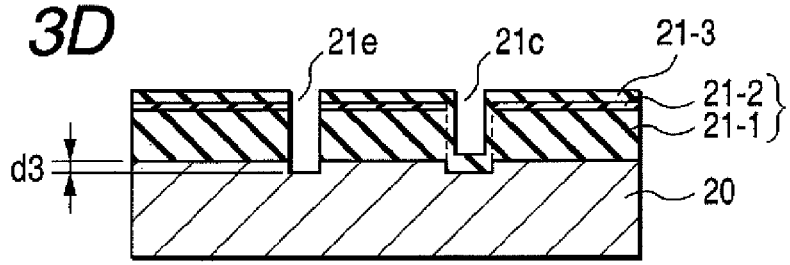
FIG. 3D is a traverse sectional view illustrating one embodiment of the method of manufacturing a thin film magnetic head.

In one embodiment, as shown in FIG. 3B, a resist layer 52 is formed by coating resist on the insulating layer 21-3, and then an opening 52a is formed by exposing and developing a region that is open on the resist layer 52. In one embodiment, as shown in FIG. 3C, the insulating layer 21-3 and the substrate 20 are dry-etched by using the ion milling method or the RIE method with the resist layer 52 having the opening 52a as a mask. In one embodiment, as shown in FIG. 3D, the resist layer 52 is removed, thereby forming a recessed portion (second recessed portion) 21e for a contact portion. In one embodiment, a depth d3 by which the recessed portion 21e for a contact portion is embedded into the substrate 20 may be about 0.05 μm to 0.5 μm in consideration of insulation from the substrate.

Figure 3E:
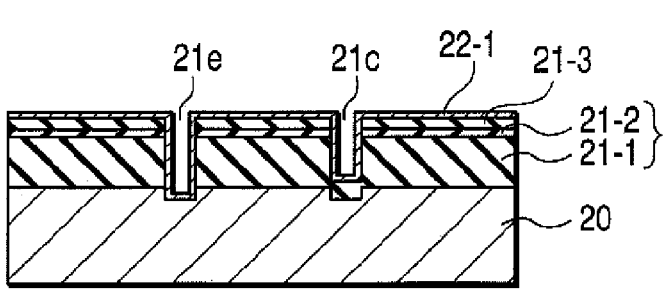
FIG. 3E is a transverse sectional view illustrating one embodiment of the method of manufacturing a thin film magnetic head.
Figure 4A:
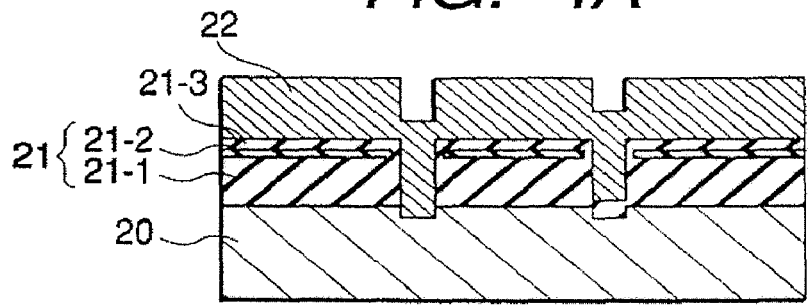
FIG. 4A is a traverse sectional view illustrating one embodiment of the method of manufacturing a thin film magnetic head.

In one embodiment, as shown in FIG. 3E, NiFe is coated onto a structure, in which patterning with respect to the contact portion has been completed, by using, for example, a sputtering method, thereby forming a coated base layer 22-1. In one embodiment, the thickness of the coated base layer 22-1 may be 0.05 μm to 0.5 μm. In one embodiment, as shown in FIG. 4A, NiFe is coated onto the coated base layer 22-1 by using a coating method, thereby forming the lower shield layer 22. In this case, the coated layer has a thickness in which at least the recessed portions 21c and the recessed portion 21e are embedded.

Figure 4B:
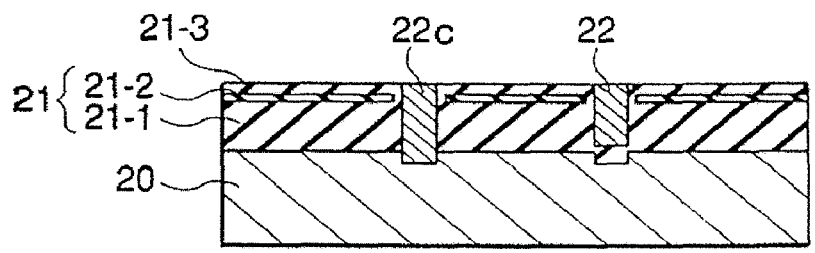
FIG. 4B is a traverse sectional view illustrating one embodiment of the method of manufacturing a thin film magnetic head.
Figure 4C:
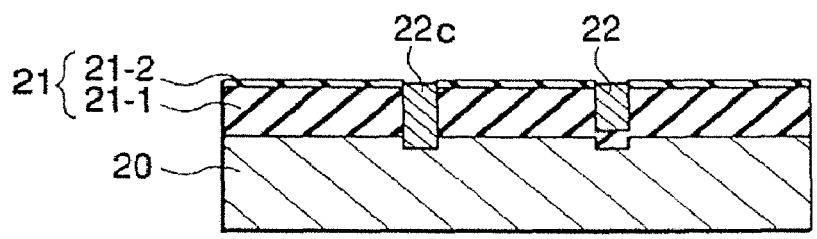
FIG. 4C is a traverse sectional view illustrating one embodiment of the method of manufacturing a thin film magnetic head.
Figure 4D:
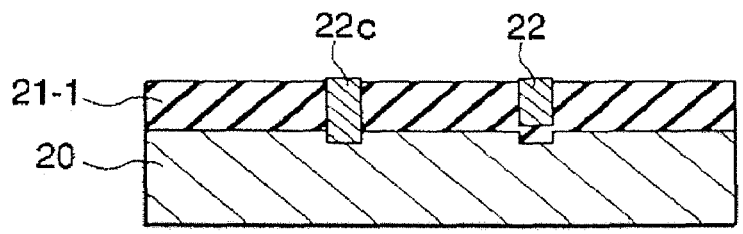
FIG. 4D is a traverse sectional view illustrating one embodiment of the method of manufacturing a thin film magnetic head.

In one embodiment, as shown in FIG. 4B, the lower shield layer 22 is polished by using a CMP (chemical mechanical polishing) method using slurry mixed with alumina particles for polishing, such that the lower shield layer 22b is embedded in the recessed portion 21c and the contact portion 22c is embedded in the recessed portion 21e. When the insulating layer 21-3 is polished by using a CMP method using slurry mixed with alumina particles for polishing, the insulating layer 21-2 is exposed, as shown in FIG. 4C. The lower shield layer 22b and the contact portion 22c are slightly polished. The insulating layer 21-2 is removed by using a milling process and then a wrapping process is performed, thereby obtaining a structure shown in FIG. 4D. Thereafter, a head structure is formed by using the lower shield layer 22b and the contact portion 22c. Subsequent processes of forming the head structure are performed in a method that is typically used. In the processes, a condition that is typically used is adopted.

As described above, in one embodiment, the recessed portion 21c for a lower shield layer is formed and then the insulating layer 21-3 is formed. In this case, since the insulating layer 21-3 is formed by film formation, it is possible to control the layer thickness. In this embodiment, it becomes possible to precisely control the thickness of the insulating layer 21-3, which serves to separate the lower shield layer 22 and the substrate 20 from each other, in the recessed portion 21c for a lower shield layer. Accordingly, it is possible to reliably improve the insulation between the lower shield layer 22 and the substrate 20. In addition, since the recessed portion 21c for a lower shield layer is formed to be embedded into the substrate 20, the heat dissipation path between the lower shield layer 22 and the substrate 20 may be shortened, which improves the heat dissipation property.

Figure 5:
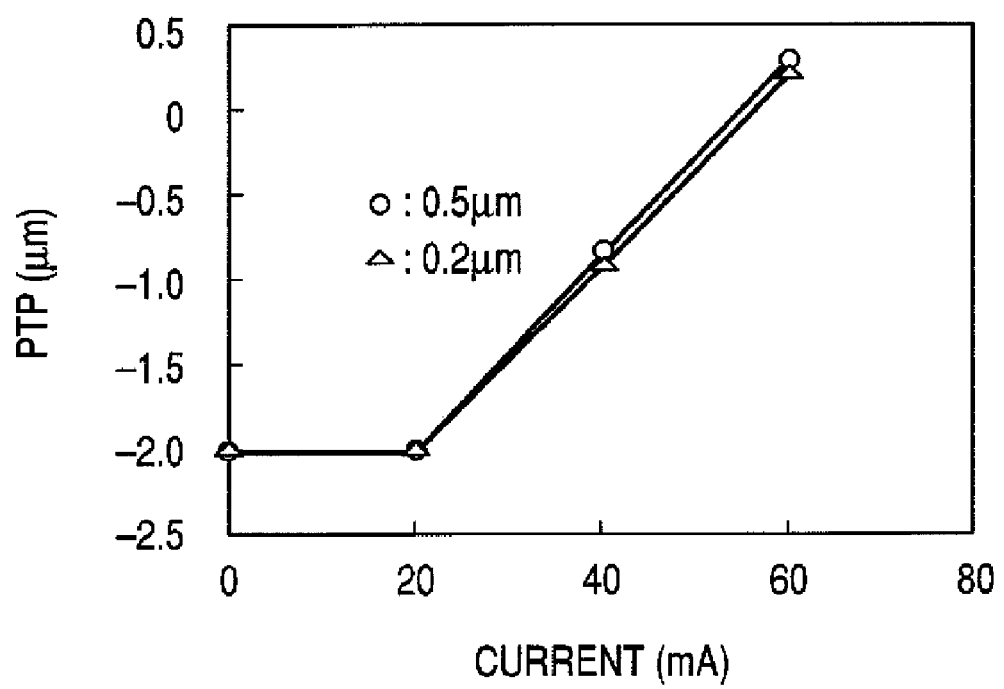
FIG. 5 is a characteristic view illustrating one embodiment of the current dependency of PTP of a lower shield layer.

An example of an experiment made to make effects of one embodiment clear will be described. The current dependency of PTP (pole tip protrusion) of a lower shield layer was examined in the thin film magnetic head manufactured by using the above-described method. In one embodiment, the thickness of an insulating layer between the lower shield layer and a substrate 20 was between about 0.5 μm and 0.2 μm. A result of the examination is shown in FIG. 5. As for PTP, dependency of the floating amount on the rotation number of media was examined for each write current of 0, 20, 40, and 60 magenta. Then, the PTP was obtained by using the difference of floating amount (sensed by an AE sensor) between a head and a media.

As is shown in FIG. 5, in any case in which the thickness of the insulating layer between the lower shield layer and the substrate is about 0.5 μm and 0.2 μm, it was confirmed that there was no practical problem related to temperature and current dependency with respect to shielding property of the lower shield layer. This can be concluded because the thickness of the insulating layer serving to separate the lower shield layer and the substrate from each other can be precisely controlled in a recessed portion for a lower shield layer by using the method described above.

The invention is not limited to the above-described embodiment but various changes and modifications thereof can be made. For example, the material or dimension of each layer in the present embodiment is only illustrative, but is not limited thereto. Therefore, modifications can be properly made without departing from the subject matter or spirit of the invention.

The invention claimed is:

1. A method of manufacturing a thin film magnetic head having a thin film magnetic head element, including a magneto-resistive effect element between an upper shield layer and a lower shield layer, provided on a substrate, the method comprising:
   providing the substrate with a first insulating layer thereon;
   processing the substrate and the first insulating layer to form a recessed portion in the substrate and the first insulating layer for a lower shield layer;
   forming a second insulating layer on the substrate and in the recessed portion; and
   forming the lower shield layer on the second insulating layer formed in the recessed portion.

2. The method of manufacturing a thin film magnetic head according to claim 1,
   wherein a depth of the substrate in the recessed portion has a depth of about 0.05 μm to 0.5 μm.

3. The method of manufacturing a thin film magnetic head according to claim 1, wherein the lower shield layer is embedded into the substrate in the recessed portion.

4. The method of manufacturing a thin film magnetic head according to claim 1, wherein the second insulating layer has a thickness of about 0.1 μm to 0.5 μm.

5. The method of manufacturing a thin film magnetic head according to claim 1, further comprising the magneto-resistive effect element on the lower shield layer, and forming the upper shield layer on the magneto-resistive effect element.

6. A method of manufacturing a thin film magnetic head having a thin film magnetic head element, including a magneto-resistive effect element between an upper shield layer and the a lower shield layer, provided on a substrate, the method comprising:
   providing a substrate with a first insulating layer thereon;
   processing the substrate and the first insulating layer to form a first recessed portion for a lower shield layer and a second recessed portion for a contact layer in the substrate and the first insulating layer;
   forming a second insulating layer on the substrate and in the first recessed portion; and
   forming the lower shield layer on the second insulating layer formed in the first recessed portion and forming a contact layer on the substrate the contact layer in the second recessed portion.

7. The method of manufacturing a thin film magnetic head according to claim 6,
   wherein the substrate in the second recessed portion has a thickness of about 0.05 μm to 0.5 μm.

8. The method of manufacturing a thin film magnetic head according to claim 6,
   wherein a depth of the substrate in the first recessed portion has a depth of about 0.05 μm to 0.5 μm.

9. The method of manufacturing a thin film magnetic head according to claim 6, wherein the lower shield layer is embedded into the substrate in the first recessed portion.

10. The method of manufacturing a thin film magnetic head according to claim 6, wherein the second insulating layer has a thickness of about 0.1 μm to 0.5 μm.

11. The method of manufacturing a thin film magnetic head according to claim 6, further comprising forming the magneto-resistive effect element on the lower shield layer, and forming the upper shield layer on the magneto-resistive effect element.

* * * * *